United States Patent Office 3,686,002
Patented Aug. 22, 1972

3,686,002
PROCESS FOR PREPARATION OF AGGREGATED FOOD PRODUCTS AND COMPOSITION THEREFOR
Sohta Nakano, 798 Komaba-cho, Meguro-ku, Tokyo, Japan; Kazumitsu Fujimoto, 118–3 Chibadera-cho, Chiba-shi, Chiba-ken, Japan; Kazuhiro Otomo, 1590–1 Hanazono-cho, Chiba-shi, Chiba-ken (% Chibaseihun Hanazonoryo), Japan; Toshiyuki Yokota, 18–14 2-chome, Kichijoji Kita-machi, Musashino-shi, Tokyo, Japan; and Hiroshi Shindo, 1672 Seya-machi, Totsuka-ku, Yokohama-shi, Kanagawa-ken, Japan
No Drawing. Filed Dec. 10, 1969, Ser. No. 884,036
Claims priority, application Japan, Dec. 24, 1968, 43/94,834; Nov. 18, 1969, 44/92,275
Int. Cl. A22c 18/00, 25/00
U.S. Cl. 99—107                                           7 Claims

ABSTRACT OF THE DISCLOSURE

Preparation of various aggregated foods by applying to surfaces of food pieces to be bonded a mixture comprising a protein, a polysaccharide and an inorganic compound of an alkaline earth metal.

---

The present invention relates to novel aggregated foods and the process for the preparation of various aggregated foods.

The primary object of this invention is to provide, at a low cost and on a large scale, a new type of handy compound foods which are balanced in nutrition as well as in taste, by freely employing various materials of raw and processed foods and by combining and integrating these materials into shapes.

As processed foods, sandwiches, hot dogs, hamburgers, salads and others have been familiar so far as to meet those mentioned requirements. The implied idea, however, was promoted in this invention to make possible the process for preparing novel compound foods in which nutrition and taste are balanced. Thus, various kinds of animal and vegetable proteins, carbohydrates, fats, etc., as raw materials of foods, are perfectly combined with each other, instead of being simply integrated, into entirely novel aggregated foods so that the aggregated state will be maintained in any cooking or transportation processes.

The second object of this invention is to provide a very effective method of adhesion for application where the tight combination of processed materials of foods to each other is required, as is in the case with hams and sausages. At present, phosphates such as polyphosphate and metaphosphates are used as combining agents in hams and sausages made of meats or fish. These phosphates are efficacious in maintaining quality of product, but afford only an insufficient adhesive property of meat or fish materials to each other. Attempts have been made, employing starch or gluten, to enhance the adhesive property, without full success, and good combining agents have long been sought.

Further, the third object of this invention is to provide a means to utilize small odd pieces of food or food materials, which are produced in the course of processing various foods, by integrating and combining these pieces into desired shapes.

In processing meats and fishes, for example, where eatable parts are cut out of animal bodies, many small pieces of eatable parts are produced. They are irregularly shaped and therefore the commercial value thereof is estimated lower due to their limited use. If these small pieces of foods of indefinite shapes could be combined with each other and integrated into a certain shape, the commercial value would be raised.

But, as a matter of fact, difficulties are encountered in manufacturing aggregated foods by combining with each other these pieces of raw or processed food materials. Namely, the conditions of surfaces of these pieces are not entirely suited to adhesion, because in many cases they are wet and show a wide variation in pH values, and in some cases their surfaces are covered with blood or other body fluid, fat, etc. In the case of raw foods, a generally applied conventional method of adhesion, in which the water content in the adhesive agent is removed by warming or heating to complete the adhesion, can never be adopted as such a method can not maintain the freshness of foods. The adhered surfaces are required not to separate in all treatments in subsequent processes, such as boiling, roasting, smoking, seasoning, cutting and transportation. Further, of course, the adhesive agent applied and the condition under which the adhesion is conducted should be selected so as not to deteriorate the quality of foods and the adhesive agent itself must not be harmful to the human body.

Thus, adhesion of food pieces has many difficulties which are entirely different from those encountered in the adhesion of, for example, fibers and metals, and therefore the difficulties have not yet been overcome.

The present invention, which has been accomplished through extensive researches and experiments to manufacture novel aggregated foods that are nutritive, tasteful and convenient and at the same time to highly utilize the raw materials of various foods, has overcome the above-mentioned difficulties satisfactorily and has succeeded in combining very firmly and easily pieces of raw and processed food materials to prepare various kinds of aggregated foods.

More particularly, the present invention employs an adhesive mixture comprising (1) an inorganic compound of alkaline earth metals (designated hereinafter as an alkaline agent) with at least one selected from the group consisting of (2) protein substances and (3) polysaccharide substances, and the protein substances include proteins, their decomposition products and derivatives which contain at least 30 mols of carboxyl groups per $10^5$ g. and exhibit at room temperature solubility or dispersion in water having a pH range from 7 to 14 and in addition the aqueous solution or dispersion containing less than 30% of solid ingredient is gelatinized, and the polysaccharide substances include polysaccharides, their decomposition products and derivatives which contain at least 0.3 carboxyl group per polymer unit and exhibit at room temperature solubility or dispersion in water having a pH range from 7 to 14 and in addition the aqueous solution or dispersion containing less than 30% of solid ingredient is gelatinized. The adhesive mixture is spread over at least one of the two surfaces of food pieces to be combined and then the pieces are attached at the surfaces to complete adhesion and obtain an aggregated food.

The raw materials and processed pieces of foods to which this invention can be applied include animal meat such as pork, beef, mutton and chicken, fishes such as tuna, salmon, trout and herring, meat of the crustacea such as lobster, shrimp and crab, shellfishes, eggs of fishes such as herring roe and salmon roe, sea weed such as tangle and *Undaria pinnatifida*, meat products such as pressed ham, sirloin ham, bacon, corned beef, sausage and hamburgers cheeses of many kinds, animal fat such as of domestic animals and fish, artificial meat, fruits and as apple and banana, and vegetables such as potato, carrot, lettuce, cabbage and onion.

The process of this invention of combining raw materials or processed pieces of foods can be applied to an object either in a fresh state or processed such as, for example, boiled, broiled, smoked, salted, sugared or otherwise seasoned. In addition, combination of the raw materials or processed pieces of foods may be changed in any way as desired.

In the case where dried pieces of foods or raw materials or processed pieces of foods of low water content are the starting materials of aggregated foods, it is desirable that the surfaces of these pieces which are to be combined be moistened with water beforehand.

The protein substances and the polysaccharide substances employed as material for the combining agent may include any protein and polysaccharide, respectively, which has the carboxyl group content, solubility and the capability of gelatinization as specified above.

As for the carboxyl group content of the protein substances, a content of at least 30 mols is desired per $10^5$ g. For less than 30 mols, though capable of jelly formation, the substance can not afford an adhesion which is sufficient with respect to strength and water-resistance.

The desirable carboxyl group content of polysaccharide substances is at least 0.3 per polymer unit. For less than 0.3, satisfactory adhesion can not be expected as in the case of protein substances. The polymer unit of polysaccharide substances referred to above means a unit of anhydrous monosaccharides which are combined with each other by ether bonding.

"Jelly" as used herein is a state of matter having stable elasticity in which molecules are arranged in a close packing in an aqueous medium as a result of gelatinization when protein or polysaccharide substances having the above-mentioned carboxyl group contents and solubilities are dissolved or dispersed in neutral or alkaline water at room temperature so as to be less than 30% with respect to the solid ingredient concentration. Any protein or polysaccharide substances which can be gelatinized at a concentration below 30% of solid ingredient can be used for the application of the present method of adhesion, so long as their carboxyl group contents are in the range as specified above, but those substances which can be gelatinized only over that concentration can not practically afford sufficient strength of adhesion.

In the conditions cited above, the jelly formation promotes the close packing in the adhesive layer, and therefore the higher the capability for jelly formation, the larger the adhesion strength and the water-resistance.

Substances which meet these requirements include protein substances such as egg-white, casein and deamided gluten, and polysaccharide substances such as sodium alginate, carboxymethylcellulose and carboxymethylstarch.

Further, by combination of these substances, their characteristics can be utilized for adhesion.

As the alkaline agent, hydroxides of alkaline earth metals such as calcium hydroxide, magnesium hydroxide and barium hydroxide, and oxides of alkaline earth metals such as calcium oxide, magnesium oxide and barium oxide may be used.

The proportion in quantity of the alkaline agent to the protein or the polysaccharide substances varies depending on the natures of these substances, their carboxyl group contents, their solubilities and their capabilities for jelly formation and also on the nature of the objec to which to apply the adhesive agent and the desired strength of adhesion, but in general 2–50 parts of the alkaline agent is preferred for each 100 parts of protein or polysaccharide substances, i.e., a ratio of protein or polysaccharide to alkaline agent in the range from 1:0.02 to 1:0.5. In any case, less than 2 parts of the alkaline agent gives insufficient adhesive strength. On the other hand, however, over 50 parts of the agent should be avoided because it results in deterioration of foods pieces owing to the excessive alkali.

The amount of the adhesive agent to be applied on the surface of food pieces also varies depending on the nature and the condition of the surface of the food pieces, but the minimum amount that uniformly covers the surface suffices, and that is 0.03–1.00 g. per 10 $cm.^2$ of the surface. Use of less than 0.03 g. does not give sufficient strength of adhesion in most cases and application of over 1.00 g. makes the adhesive layer thick which might give an unsatisfactory appearance.

The temperature at adhesion may be selected arbitrarily as long as the water necessary for adhesion is neither frozen nor evaporated. However, heating or freezing after the adhesion has been completed scarcely affects the strength of adhesion.

Time required for the adhesion to be completed is from several minutes to not more than an hour.

The pH value does not particularly influence the strength of adhesion as long as the pH lies in the ordinary range of food pieces of various kinds.

The mechanism of adhesion in the process of this invention may be explained as follows: first, the water contained in the food pieces (or the water added in a small amount when the food pieces contain little water) penetrates into the adhesive agent of the above composition to activate the alkaline agent, and the carboxyl groups, which are rendered in a dissociated state in the protein or polysaccharide substances are combined to each other through the alkaline earth metals as intermediaries so that a firm and water-resistant layer of a network structure which supports adhesion seems to be formed. At the same time, the alkaline agent acts on the surface of the food pieces to promote penetration of the adhesive agent into the tissues of the food where the agent is solidified and converted into a waterproof subtsance that forms a firm network structure, and thus the combined effects give firm adhesion between the food pieces.

The adhesion strength of aggregated foods of the present invention varies to some extent depending on the nature of the aggregated foods and the adhesive agent and also on the composition of the latter, but at any rate the adhesion is strong enough so that the adhered layers are hardly detached in subsequent processing and transportation.

For illustration, 1.5 g. of a powdery mixture consisting of 100 parts of milk casein and 20 parts of calcium hydroxide was applied to the surfaces to be adhered of two pieces of pork. The pork pieces (10 x 5 x 3 cm.) were lightly pressed to each other, allowed to stand for 1 hour and then cut into 10 test pieces of the dimension 5 x 6 x 1 cm. In total, 30 test pieces were prepared following the same procedure. To examine the strength of adhesion, each piece was vigorously shaken several times with one end held by fingers. As a result only one piece was detached, but the remainder were not detached. As for the remaining 29 test pieces, one end of each piece was firmly held and a weight was applied to the other end to measure the weight required for separating the adhered surfaces. It was revealed that the adhered surfaces stand up to 115 g., on the average, of stretching load per $cm.^2$ of surface. Doubtlessly, the above strength of adhesion permits handling the product safely without separating the adhered surfaces.

The aggregated foods of this invention exhibit enough strength of adhesion so that the state of aggregation persists almost perfectly throughout various subsequent treatments.

As materials of aggregated foods, a large variety of raw and processed foods in pieces, each different in taste, nutrition and mouth-feel, can be freely chosen and mixed. The products may be consumed, for example, as an appetizing new food of novel appearance, children's foods to prevent unbalanced nutrition, foods for patients to use for dietary treatment and instant foods to be carried for picnics. Therefore, taste, nutrition, mouth-feel, shape, convenience and ease of cooking of the foods can be emphasized depending on the object. The present invention provides an entirely novel type of aggregated foods which contribute to a great extent to the improvement of foods.

Moreover, in manufacturing the aggregated foods of this invention, the temperature at which the pieces of foods are adhered may be varied in a wide range so that the quality of foods is not deteriorated, and no particular condition of manufacturing is required. Those materials required to be adhered in a fresh condition such as, for example, meats, roes, vegetables and fruits can be made into aggregated foods with the least deterioration in freshness. Once the adhesion has been completed, the aggregated foods can be cooked in any desired way without causing any change in the aggregation state, and, for that reason, any processing can be employed which is adopted in ordinary food processings.

The adhered products of this invention have many surfaces of adhesion between participating pieces of food. However, due to the strong adhesion they are never broken into detached pieces in any subsequent treatment such as boiling, roasting, smoking, seasoning, cutting and transportation and can accordingly be treated as an entirely novel whole piece of food or food material. Therefore, indefinitely shaped small pieces of animal meats which happen to be produced in the course of meat processing can be very easily adhered to each other to be integrated into meat blocks of a definite shape which results in enhanced commercial value of small meat pieces.

For manufacturing ham, for example, 3 blocks on the average, each being of a definite shape and of 1–1.2 kg. weight, are usually taken from a pig thigh. The remainder of the pork in small pieces can be integrated by adhesion into blocks of 1–1.2 kg. weight to raise the commercial value of the pork in small pieces. The same effect can be expected in manufacturing boiled hams such as loin roll and boneless ham.

In addition, the process of this invention can also be applied to the fields where adhesion of food pieces has long been required, such as manufacture of hams and sausages. The result is that aggregated foods of excellent quality can be obtained and the conventional processes and conditions for manufacture need not be changed.

Examples of this invention will be illustrated in a tabular form that follows.

| No. | Name of food | Dimension (cm.) | Area adhered (cm.²) | Protein and polysaccharide substances (part) | Alkaline agent (part) | Amount added (g.) | Temperature of adhesion (°C.) | Time applied to adhesion (min.) |
|---|---|---|---|---|---|---|---|---|
| 1 | Pork / Chicken | 10 x 5 x 5 / 10 x 5 x 2 | 50 | A (100) | Ca(OH)₂ (20) | 2.5 | 10 | 10 |
| 2 | Tuna / Mutton | 8 x 5 x 2 / 8 x 5 x 2 | 40 | A+B 75:25 | Mg(OH)₂ (30) | 2.0 | 3 | 10 |
| 3 | Salmon / Lard | 8 x 5 x 2 / 8 x 5 x 1 | 40 | A+C (50:50) | CaO (25) | 2.0 | 5 | 50 |
| 4 | Beef (2 pieces) / Processed cheese / Gouda cheese / Potato | 5 x 5 x 0.4 / 5 x 5 x 0.4 / 5 x 5 x 0.4 / 5 x 5 x 0.4 | 100 | A+D (60:40) | MgO (15) | 2.8 | 15 | 60 |
| 5 | Potato / Lard | 5 x 5 x 3 / 5 x 5 x 1.5 | 25 | A+a (50:50) | Ba(OH)₂ (8) | 0.8 | 15 | 15 |
| 6 | Onion / Cheese / Suet | 4 x 3 x 0.2 / 4 x 3 x 0.5 / 4 x 3 x 0.5 | 24 | A+b (80:20) | BaO (10) | 0.5 | 21 | 30 |
| 7 | Apple / Cheese | 3 x 3 x 1 / 3 x 3 x 0.3 | 9 | B (100) | Ca(OH)₂ (5) | 0.02 | 23 | 30 |
| 8 | Apple / Banana | 2 x 2 x 1 / 2 x 2 x 0.5 | 4 | C (100) | CaO (5) | 0.02 | 23 | 15 |
| 9 | Apple (2 pieces) / Potato / Tangle | 5 x 3 x 1 / 5 x 3 x 0.5 / 5 x 3 x 0.1 | 45 | C+D (50:50) | Ca(OH)₂ | 1.8 | 25 | 40 |
| 10 | Tangle / Herring roe | 8 x 7 x 0.1 / ¹5.5 | | C+a (60:40) | Ca(OH)₂ (2) | 0.9 | 10 | 30 |
| 11 | Tangle / Herring roe / Lettuce | 8 x 7 x 0.1 / ¹5.5 / 8 x 7 x 0.1 | | C+b (40:60) | Ca(OH)₂ (8) | 1.5 | 10 | 30 |
| 12 | Tangle / Salmon roe / Ham | 8 x 7 x 0.1 / ¹11.2 / 8 x 7 x 0.3 | | D (100) | Ca(OH)₂ (15) | 1.2 | 25 | 60 |
| 13 | Tangle / Scallop / Potato | 3 x 3 x 0.1 / 3 x 3 x 0.5 / 3 x 3 x 0.5 | 18 | D+a (80:20) | Ca(OH)₂ (20) | 0.5 | 25 | 30 |
| 14 | Lobster (2 pieces) / Tangle / Pork | 10 x 3 x 1 / 10 x 3 x 0.1 / 10 x 3 x 1 | 90 | D+c (50:50) | Ca(OH)₂ (50) | 3.5 | 18 | 20 |
| 15 | Lobster (2 pieces) / Cheese / Potato | 5 x 5 x 1 / 5 x 5 x 0.3 / 5 x 5 x 0.3 | 75 | a(100) | Ca(OH)₂ (15) | 3.2 | 18 | 20 |
| 16 | Herring roe / Salmon roe | ¹60 / ¹40 | | a+b (70:30) | Ca(OH)₂ (20) | 4.8 | 10 | 60 |
| 17 | Mutton / Lard | 20 x 10 x 5 / 20 x 10 x 2 | 200 | b (100) | Ca(OH)₂ (35) | 20 | 12 | 30 |
| 18 | Tangle / Cheese / Herring roe | 8 x 7 x 0.1 / 8 x 7 x 1 / ¹5.5 | | b+c (50:50) | Ca(OH)₂ (35) | 1.5 | 25 | 60 |
| 19 | Tangle / Undaria pinnatifida | 8 x 7 x 0.1 / 8 x 7 x 0.05 | 56 | c (100) | Ca(OH)₂ (40) | 3.8 | 25 | 45 |
| 20 | Small pieces of pork leg / Lard / Salmon / Chicken / Veal / Lettuce / Cheese / Flavorings | ¹20 / ¹10 / ¹10 / ¹20 / ¹10 / ¹20 / ¹10 / ¹0.8 | | A+C+a (60:20:20) | Ca(OH)₂ (8) | 8.0 | 5–8 | |
| 21 | Artificial meat / Bacon / Tuna / Lard / Crab / Pieces of tangle / Onion / Carrot / Cheese / Flavorings | ¹30 / ¹10 / ¹10 / ¹10 / ¹5 / ¹5 / ¹10 / ¹10 / ¹10 / ¹1.0 | | A+D+b (60:20:20) | Ca(OH)₂ (6) | 6.0 | 5 | |

See footnotes at end of table.

TABLE—Continued

| No. | Food piece Name of food | Dimension (cm.) | Area adhered (cm.²) | Adhesive agent Protein and polysaccharide substances (part) | Alakline agent (part) | Amount added (g.) | Temperature of adhesion (° C.) | Time applied to adhesion (min.) |
|---|---|---|---|---|---|---|---|---|
| 22 | Beef / do | 20 x 15 x 4 / 20 x 15 x 4 | 300 | A+B+a+b (40:10:30:20) | Ca(OH)$_2$ (20) | 18.0 | 5 | 10 |
| 23 | Tuna / do | 15 x 5 x 3 / 15 x 5 x 3 | 75 | A+C+b+c (70:10:10:10) | Ca(OH)$_2$ (18) | 3 | 3 | 45 |
| 24 | Potato / do | 4 x 4 x 1 / 4 x 4 x 1 | 16 | A+B+C+D+a (20:10:25:35:10) | Ca(OH)$_2$ (30) | 1 | 25 | 40 |
| 25 | Herring roe | | [1] 40 | A+B+C+D+a+b+c (15:15:15:10:15:15:15) | Ca(OH) (10) | 2.4 | 10 | 60 |

[1] Grams.

NOTE.—A=Milk casein; B=Soybean casein; C=Egg-white; D=Deamided gluten (100% deamided by the usual process); a=Sodium alginates; b=Carboxymethylcellulose; c=Carboxymethylstarch.

| No. | Pretreatment and mode of aggregation [1] | Treatment after adhesion | Observations |
|---|---|---|---|
| 1 | The adhesive agent was applied uniformly onto the surface to be ahered of the piece of pork to which the piece of chicken was put. Procedures similar to this one apply to the following examples unless otherwise described. | Kept frozen for a month at −20° C., then the half thawed matter was sliced into 5 x 7 x 1 cm. | The adhered surface was not separated when the slice was pulled at both ends. |
| 2 | | Kept frozen for 3 months at −30° C., then the half thawed matter was sliced into 5 x 4 x 1 cm. | Do. |
| 3 | | Sliced into 5 x 3 x 1 cm., coated with crumbs and fried. | The ahered surface was not separated at and after cooking. |
| 4 | Between 2 pieces of beef, 2 kinds of cheese and a potato piece were placed in sandwich. | Fried immediately | Do. |
| 5 | | do | Same as above. The adhered surface was not separated at and after cooking. |
| 6 | The surface of cheese to be adhered was moistened beforehand with 0.5 cc. of water and then the adhesive agent was applied. | Fried immediately | The adhered surface was not separated at and after cooking. Same as above. |
| 7 | | do | Eaten without further treatment. Not peculiar tasting, smelling or discolored. The adhered suface was not separated. |
| 8 | | | Do. |
| 9 | Tangle was a dried one which was restored with water before use. Tangle and boiled potato were sandwiched between 2 pieces of apple. | Boiled in boiling water | The adhered surface was not separated at and after cooking. Racy. Not peculiar tasting. smelling or or discolored. |
| 10 | Tangle was a dried one which was restored with water before use. 0.6 g. of adhesive agent was applied. Commercial salted herring roe was broken up into pieces to which 0.3 g. of adhesive agent was applied, and placed on the surface of of the tangle. | Salted in kitchen salt and allowed to stand for a week. | After storing in salt, taken out from salt and washed with running water without separating at the surface. No difference in appearance from natural one. No peculiar taste, smell and discoloring. |
| 11 | Tangle was treated as in No. 10, to which boiled lettuce was adhered. 0.6 g. of adhesive agent was applied to the surface of lettuce to which was adhered herring roe as in No. 10. | Pickled in vinegar for a day | No separating at the adhered surface. Crispy when chewed. |
| 12 | Ham was adhered on tangle in the same manner as in No. 11, 0.7 g. of adhesive agent was applied to the surface of ham. To it, commercial salted salmon roe to which 0.3 g. of adhesive agent was uniformly applied was adhered. | Kept soaked for 3 months in concentrated salt water. | Unique appearance, tasty. No separating. |
| 13 | | Boiled in boiling water | No separating at the adhered surface, at and after cooking. |
| 14 | Tangle was a dried one which was restored with water before use. Tangle and pork were sandwiched in between 2 pieces of lobster. | Coated with crumbs and fried | Tasty. No separating. |
| 15 | Cheese and boiled piece of potato were sandwiched in between 2 pieces of boiled lobster. | | Served without further treatment. Tasty. No peculiar taste or smell. No separating. |
| 16 | Commercial salted roes of herring and salmon, broken up into pieces were thoroughly mixed and adhesive agent was uniformly admixed. The whole mixture was pressed into a cellulose tube to complete adhesion. | | The aggregated food of herring and salmon roes, pressed out of the tube, exhibited unique appearance and taste. Sufficient strength of adhesion. No separating. |
| 17 | | Sliced in pieces of 10 x 7 x 1 cm. Roasted on direct fire. | The adhered product was not separated when pulled strongly at both ends. Retained sufficient strength of adhesion after roasting. More tasty than mutton alone. |
| 18 | Tangle was treated as in No. 10 to which was adhered cheese and then herring roe as in No. 10. | | Sufficient strength of adhesion. Unique appearance not observed before. No separating. |
| 19 | Adhered under slight application of pressure. | Stored for a month in concentrated salt water. | Sufficient strength of adhesion. No separating. |
| 20 | According to the ordinary process for preparing pressed ham, the cured meats, adhesive agent and other materials were mixed for 1 minute with a mixer at 150 r.p.m. and then immediately submitted to stuffing. | According to the ordinary process for preparing pressed ham, processes of smoking, cooling and packing were followed to obtain final product. | The ordinary process for preparing pressed ham could be applied. A minute of mixing time sufficed, being 1/5–1/10 of ordinarily required time. The product was tightly combined. No peculiar taste, smell or discoloring. |
| 21 | Dried artificial meat, made of soybean protein, was restored with water before use. Flank of pork was cured in the ordinary way. These meats, together with the adhesive agent and other materials, were mixed for 1 minute with a mixer at 150 r.p.m. and were immediately submitted to stuffing. | do | Do. |
| 22 | | Sliced in pieces of 15 x 4 x 1 cm. Roasted on direct fire. | No separating observed at the adhered surface at and after cooking. No particular difference in taste and appearance from ordinary beef. |
| 23 | | Frizzled with oil | No difference in appearance from ordinary tuna: No separating at the surface of adhesion when vigorously shaken with an end held by hand. Sufficient strength of adhesion was retained after cooking. |
| 24 | | Boiled in boiling water | No difference in appearance from ordinary potato: Sufficient strength of adhesion, which was retained after cooking. |
| 25 | Herring roe employed in this example had been broken up into pieces before it appeared commercially. These pieces, uniformly mixed with adhesive agent, were pressed into a cellulose tube. | Soaked overnight in a saturated solution of kitchen salt after it is stuffed in a cellulose tube. | The aggregation of herring roe, pressed out of the tube, satisfactorily maintained its shape, though not covered by a protective film as natural herring roe is, during packaging and transportation. |

[1] The food pieces prior to adhesion consisted of ordinary fresh or processed foods as available commercially, unless otherwise stated.

What is claimed is:

1. A process for adhering pieces of food into an aggregated food by applying to the surfaces of the pieces of food to be aggregated an adhesive mixture comprising an inorganic compound of an alkaline earth metal and at least one of a protein substance and a polysaccharide substance and combining the pieces of food into an aggregated food, said inorganic compound of an alkaline earth metal being selected from the group consisting of calcium hydroxide, magnesium hydroxide, barium hydroxide, calcium oxide, magnesium oxide and barium oxide; said protein substance containing at least 30 mols of carboxyl groups per $10^5$ g. and being gelatinizable at a concentration of solid ingredients of less than 30% in an aqueous solution or dispersion of pH 7 to 14; and said polysaccharide substance containing at least 0.3 carboxyl group per polymer unit and being gelatinizable at a concentration of solid ingredients of less than 30% in an aqueous solution of pH 7 to 14, the ratio of the protein substance and/or the polysaccharide substance to the inorganic compound of the alkaline earth metal being from 1:0.02 to 1:0.5 and the adhesive mixture being applied in the amount of 0.03–1.00 g. per 10 cm.$^2$ of the surface to be adhered of said food pieces.

2. The process according to claim 1 in which the mixture is a powder.

3. The process according to claim 1 in which the protein substance is one or more members selected from the group consisting of egg white, casein and deamided gluten.

4. The process according to claim 1 in which the polysaccharide substance is one or more members selected from the group consisting of sodium alginate, carboxymethylcellulose and carboxymethylstarch.

5. The process according to claim 1 in which the surfaces to be adhered of dried food pieces or of food pieces of a very small water content are moistened beforehand with water.

6. Process for preparing aggregated fresh meats by applying the mixture as defined in claim 1 onto the surfaces to be adhered of fresh meats in pieces and combining these pieces with other pieces of the same meat with the mixture inbetween.

7. An adhesive mixture for adhering pieces of food into an aggregated food product comprising an inorganic compound of an alkaline earth metal and at least one of a protein substance and a polysaccharide substance, said inorganic compound of an alkaline earth metal being selected from the group consisting of calcium hydroxide, magnesium hydroxide, barium hydroxide, calcium oxide, magnesium oxide, and barium oxide; said protein substance containing at least 30 mols of carboxyl groups per $10^5$ g. and being gelatinizable at a concentration of solid ingredients of less than 30% in an aqueous solution or dispersion of pH 7 to 14; and said polysaccharide substance containing at least 0.3 carboxyl group per polymer unit and being gelatinizable at a concentration of solid ingredients of less than 30% in an aqueous solution of pH 7 to 14, the ratio of the protein substance and/or the polysaccharide substance to the inorganic compound of the alkaline earth metal being from 1:0.02 to 1:0.5.

References Cited

UNITED STATES PATENTS 3,434,843   3/1969   Durst _____ 99—1

HYMAN LORD, Primary Examiner

U.S. Cl. X.R.

99—1, 100, 108, 109, 111